(12) United States Patent
Zheng et al.

(10) Patent No.: US 8,871,882 B2
(45) Date of Patent: Oct. 28, 2014

(54) METHOD FOR THE PREPARATION OF STYRENIC FLUOROPOLYMERS

(75) Inventors: Xiaoliang Zheng, Hudson, OH (US);
Dong Zhang, Uniontown, OH (US);
Jiaokai Jing, Uniontown, OH (US); Ted Calvin Germroth, Kingsport, TN (US);
Frank W. Harris, Boca Raton, FL (US);
Thauming Kuo, Kingsport, TN (US);
Bin Wang, Kingsport, TN (US);
Douglas Stephens McWilliams, Piney Flats, TN (US)

(73) Assignee: Akron Polymer Systems, Inc., Akron, OH (US)

( * ) Notice: Subject to any disclaimer, the term of this patent is extended or adjusted under 35 U.S.C. 154(b) by 269 days.

(21) Appl. No.: 13/372,621

(22) Filed: Feb. 14, 2012

(65) Prior Publication Data
US 2013/0211025 A1    Aug. 15, 2013

(51) Int. Cl.
*C08F 12/20* (2006.01)
*C08F 112/14* (2006.01)

(52) U.S. Cl.
CPC .............. *C08F 12/20* (2013.01); *C08F 112/14* (2013.01)
USPC ........... 526/251; 526/205; 526/209; 526/217; 526/225; 526/242; 526/243; 526/247; 526/248; 526/249; 526/317.1; 526/329.4; 526/338; 526/342; 524/544; 524/545; 524/714; 524/718; 524/745; 524/747; 524/762; 524/805

(58) Field of Classification Search
CPC ...................................................... C08F 12/20
USPC ................................................ 526/251, 243
See application file for complete search history.

(56) References Cited

U.S. PATENT DOCUMENTS

| | | | |
|---|---|---|---|
| 3,207,733 A * | 9/1965 | Noland ............................ | 526/93 |
| 3,386,965 A | 6/1968 | Huffman | |
| 4,461,886 A | 7/1984 | Rogers et al. | |
| 5,039,785 A | 8/1991 | Irwin | |
| 5,160,619 A | 11/1992 | Yamaguchi et al. | |
| 5,177,149 A | 1/1993 | Angeli et al. | |
| 5,189,538 A | 2/1993 | Arakawa | |
| 5,290,887 A | 3/1994 | Hefner et al. | |
| 5,387,657 A | 2/1995 | Hefner et al. | |
| 5,396,355 A | 3/1995 | Wada et al. | |
| 5,427,712 A | 6/1995 | Nakamura et al. | |
| 5,498,639 A * | 3/1996 | Wei et al. ......................... | 521/27 |
| 5,529,818 A | 6/1996 | Tsuda et al. | |
| 5,532,322 A | 7/1996 | Kadono et al. | |
| 5,580,950 A | 12/1996 | Harris et al. | |
| 5,677,390 A | 10/1997 | Dadgar et al. | |
| 5,698,676 A | 12/1997 | Dhaon | |
| 5,985,942 A | 11/1999 | Steck et al. | |
| 6,115,095 A | 9/2000 | Suzuki et al. | |
| 6,175,400 B1 | 1/2001 | Duncan et al. | |
| 6,881,454 B2 | 4/2005 | Taguchi | |
| 7,037,443 B2 | 5/2006 | Shuto et al. | |
| 7,135,211 B2 | 11/2006 | Shuto et al. | |
| 7,227,602 B2 | 6/2007 | Jeon et al. | |
| 7,236,221 B2 | 6/2007 | Ishikawa et al. | |
| 2002/0041352 A1 | 4/2002 | Kuzuhara et al. | |
| 2004/0051831 A1 | 3/2004 | Su Yu et al. | |
| 2005/0057714 A1 | 3/2005 | Jeon et al. | |
| 2005/0105027 A1 | 5/2005 | Wada et al. | |
| 2005/0200792 A1 | 9/2005 | Jeon et al. | |
| 2005/0270458 A1 | 12/2005 | Ishikawa et al. | |
| 2006/0062935 A1 | 3/2006 | Murakami | |
| 2006/0114383 A1 | 6/2006 | Kobayashi et al. | |

(Continued)

FOREIGN PATENT DOCUMENTS

| | | |
|---|---|---|
| EP | 1 506 991 A3 | 8/2005 |
| JP | 2007 046 059 | 2/2007 |

(Continued)

OTHER PUBLICATIONS

Nikitina, "alpha-beta-beta-trifluorostyrene and polymers based on it", Russian Chemical Reviews, 1990, 59, 6, 575-589.*

Zhang, D., et al., "Mesogen-Jacketed Liquid Crystal Polymers with Mesogens of Aromatic Amide Structure" Polymers for Advanced Technologies, Wiley & Sons, Bognor Regis, GB, vol. 18, No. 4, Apr. 1, 1997, pp. 227-233, XP000691535.

Zhang, et al., "Synthesis of a New Side-Chain Type Liquid Crystal Polymer Poly[dicyclohexyl vinylterephtalate]" Macromolecules, ACS, Washington, DC, U.S., vol. 32, Jan. 1, 1999, pp. 4494-4496, XP002495422, ISSN: 0024-9297.

(Continued)

*Primary Examiner* — Nicole M Buie-Hatcher
(74) *Attorney, Agent, or Firm* — Benesch Friedlander Coplan & Aronoff LLP

(57) ABSTRACT

A method for the preparation of a fluoropolymer by means of emulsion polymerization of a reaction mixture in an aqueous medium is disclosed wherein the reaction mixture includes a fluoromonomer having the structure of

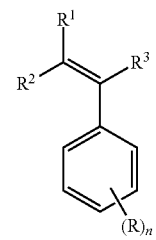

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is each independently a substituent on the styrenic ring, n is an integer from 0 to 5 representing the number of the substituents on the styrenic ring; b) an emulsion stabilizer combination comprising: i) an anionic surfactant; and, ii) a cationic surfactant or a non-ionic surfactant; and, c) a free-radical initiator.

25 Claims, 1 Drawing Sheet

(56) References Cited

U.S. PATENT DOCUMENTS

| | | | |
|---|---|---|---|
| 2006/0135715 A1* | 6/2006 | Yang | 526/243 |
| 2007/0020407 A1 | 1/2007 | Umemoto et al. | |
| 2007/0046870 A1 | 3/2007 | Murakami et al. | |
| 2007/0177087 A1 | 8/2007 | Kawahara et al. | |
| 2008/0239491 A1 | 10/2008 | Zheng et al. | |
| 2008/0241565 A1 | 10/2008 | Germroth et al. | |
| 2009/0068380 A1 | 3/2009 | Zheng et al. | |

FOREIGN PATENT DOCUMENTS

| | | | |
|---|---|---|---|
| JP | 2007-063417 | | 3/2007 |
| JP | 2007-231224 | | 9/2007 |
| JP | 2009-079210 | | 4/2009 |
| SU | 416364 A | * | 7/1974 |
| WO | 2008 121 584 | | 10/2008 |

OTHER PUBLICATIONS

Zhao, et al., Synthesis and Characterization of Diblock Copolymers Based on Crystallizable Poly(e-caprolactone) and Mesogen-Jacketed Liquid Crystalline Polymer Block: Polymer, Elsevier Science Publishers B.V., GB, vol. 46, No. 14, Jun. 27, 2005, pp. 5396-5405, XP004924379, ISSN: 0032-3861.

Li, et al., "Hierarchical Assembly of a Series of Rod-Coil Block Copolymers: Supramolecular LC Phase in Nanoenvironment" Macromolecules 2004, vol. 37, No. 8, pp. 2854-2860.

Luo, et al., "Conduction Mechanism in a Novel Oxadiazole Derivative: Effects of Temperature and Hydrostatic Pressure" J. Phys. D: Appl. Phys. vol. 38, 2005, pp. 1132-1135, IOP Publishing Ltd. Printed in the UK.

Ito, H.; Oka, W.; Goto, H.; Umeda, H.; Plastic Substrates for Flexible Displays, JP Journal of Applied Physics, vol. 45, No. 5B, 2006, pp. 4325-4329.

Li, F.; Harris, F.W.; Cheng, S.Z.D.; Polyimide Films As Negative Birefringent Compensators for Normally White Twisted Nematic Liquid Crystal Displays, Polymer vol. 37, No. 23, 1996, pp. 5321-5325.

Matthews, A. S.; Kim, I.; Ha, C.S.; Fully Aliphatic Polyimides From Adamantane-Based Diamines for Enhanced Thermal Stability, Solubility, Transparency, and Low Dielectric Constant, Dept. of Polymer Science and Engineering, Pusan National University, Busan, 2006, pp. 609-735, Korea.

Mehdipour-Antaei, S.; Babanzadeh, S.; New Types of Heat-Resistant, Flame-Retardant Ferrocene-Based Ployamides With Improved Solubility, Iran Polymer and Petrochemical Institute, P. O. Box 14965/115, Tehran, Iran (Available at ScienceDirect, Reactive & Functional Polymers 67, 2007, pp. 883-892.

Liou, G.S.; Hsiao, S.H.; Ishida, M.; Kakimoto, M.; Imai, Y.; Synthesis and Characterization of Novel Soluble Triphenylamine-Containing Aromatic Polyamides Based on N,N'-Bis(4-Aminophenyl)-N,N'-Diphenyl-1,4-Phenylenediamine; Journal of Polymer Science; Part A: Polymer Chemistry, vol. 40, 2002, pp. 2810-2818.

Phillips, R.E.; Soulen, R.L.; Propylene Oxide Addition to Hydrochloric Acid, Journal of Chemical Education, vol. 72, No. 7, Jul. 1995, pp. 624-625.

Seo, K.B.; Jeong, J.K.; Choi, S.J.; Hong, Y.T.; Suh, D.H.; Synthesis and Characterization of Novel Aromatic-Aliphatic Poly(Amide-Imide-Imide)S (PAII), Die Angewandte Makromolekulare Chemie 264, 1999, oo, pp. 30-38, (Mr 4590).

Ebadi, H.; Mehdipour-Ataei, S.; Heat-Resistant, Pyridine-Based Polyamides Containing Ether and Ester Units With Improved Solubility, Chinese Journal of Polymer Science, vol. 28, No. 1, 2010, pp. 29-37.

Mehdipour-Ataei, S.; Hatami, M.; Mosslemin, M.H.; Organosoluble, Thermally Stable Polyamides Containing Sulfone and Sulfide Units, Chinese Journal of Polymer Science, vol. 27, No. 6, 2009, pp. 781-787.

Chai, C.; Wang, J.; Fan, X.; Chen, X.; Zhou, Q.; Synthesis and Characterization of Mesogen Jacketed Liquid Crystalline Polymer Containing 1, 3, 4-Oxadiazole, Beijing National Laboratory for Molecular Science, Key Laboratory of Polymer Chemistry and Physics of Ministry of Education College of Chemistry and Molecular Engineering, Peking University, Beijing, 2006, 532-535.

Liu, J.M.; Lee, T.M.; Wen, C.H.; Leu, C.M.; High Performance Organic-Inorganic Hybrid Plastic Substrate for Flexible Display and Electronics, MCL, Industrial Technology Research Institute, Chutung, Hsinchu, 310 Taiwan, ROC, SID 10 Digest, pp. 913-916.

* cited by examiner

METHOD FOR THE PREPARATION OF STYRENIC FLUOROPOLYMERS

FIELD

This invention relates to styrenic fluoropolymers, and methods for the preparation of a fluoropolymer by emulsion polymerization in an aqueous medium. More specifically, this invention relates to an emulsion polymerization method in the presence of an emulsion stabilizer combination for the production of a styrenic fluoropolymer having the desirable properties such as reaction yield, polymer molecular weight, and polymer glass transition temperature. The fluoropolymer thus prepared is particularly suitable for applications in high-performance films and coatings.

BACKGROUND

Fluoropolymer is a polymer having fluorine atoms attached to the backbone of the polymer. Common fluoropolymers are polytetrafluoroethylene (PTFE), ethylene-tetrafluoroethylene (ETFE) copolymers, tetrafluoroethylene (TFE) and hexafluoropropylene (HFP) copolymers, and poly(vinylidine fluoride) (PVDF). Aqueous emulsion polymerization is known to be a particularly effective method to prepare such fluoropolymers. The emulsion polymerization process often requires the use of a fluorinated surfactant to stabilize the emulsion due to the high hydrophobicity of the monomer and the polymer formed. The fluorinated surfactant, such as perfluoroalkanoic acid or salt, is able to provide good dispersion stability, high polymerization yield, small particle sizes, and other desirable polymerization properties. However, this type of surfactant has increasingly become less favored due to the environmental concern and its high cost. An alternative method that can make use of more common surfactants is thus highly desirable.

Fluoropolymers are known to exhibit exceptional resistance to high temperature, chemicals, corrosion, and abrasion. They are capable of providing mechanical toughness, low friction, non-stick, and other properties desirable for high performance plastics, films, and coatings. Polystyrene is one of the most widely used plastics. Compared to aliphatic polymers, such as polyethylene and polypropylene, polystyrene is capable of providing unique mechanical and optical properties due to the presence of the hard, polarizable aromatic ring. However, polystyrene is inherently brittle, which has caused deficiencies in many of its applications. Thus, it is of particular interest to provide strong carbon-fluorine bonds to the backbone of polystyrene as a solution to solve this shortcoming and to obtain the unique properties exhibited by other fluoropolymers.

Fluoropolymers having a styrenic structure have not been widely studied due to the difficulty in preparing such monomers. Their polymerization methods have also rarely been investigated. Among various styrenic fluoropolymers, poly(α,β,β-trifluorostyrene) (PTFS) having the most fluorine atoms in the backbone is of particular interest. The preparation of PTFS disclosed in the prior art has been based on a study by Prober (J. of Amer. Chem. Soc., v. 75; 1953, p. 968-972). Prober teaches the preparation of PTFS by emulsion polymerization in the presence of a single surfactant using, respectively, Ivory® soap (yield, 67%), Aerosol OT (yield, 47%), or dodecylamine hydrochloride (yield, 83%). The method of using dodecylamine hydrochloride as the surfactant for the emulsion polymerization of α,β,β-trifluorostyrene (TFS) type of fluoromonomers has been further disclosed in U.S. Pat. Nos. 5,422,411 and 6,774,150.

It is known in the art that polymers produced from a polymerization process that results in low yields would have deficiencies in polymer properties such as molecular weight (MW) and glass transition temperature (Tg), which in turn would have detrimental effects on the mechanical and optical properties of the polymer films or coatings formed. In the application of fluoropolymers for high-performance films and coatings, it is particularly desirable to have a polymerization process that is capable of producing fluoropolymers in high yields due to the high cost of the fluoromonomer and the demand for high polymer quality. Thus, there exists a need for a polymerization process that is capable of producing fluoropolymers in high yields and with the desirable properties.

BRIEF DESCRIPTION OF THE DRAWINGS

At least one embodiment is set forth in the following description and is shown in the drawings and is particularly and distinctly pointed out and set forth in the appended claims.

SUMMARY

Figure 1:
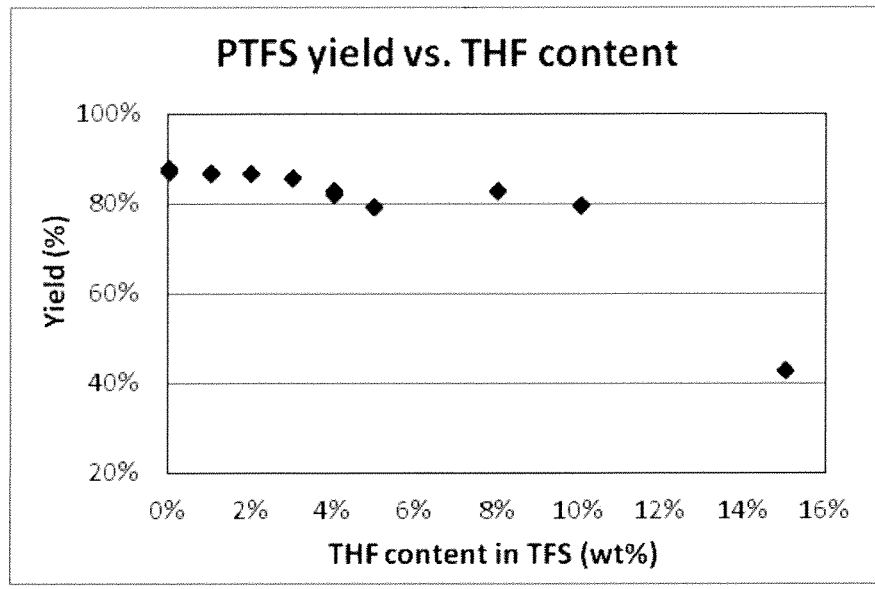
FIG. 1 is a chart showing test results; and,
FIG. 2 is a chart showing test results.

In one embodiment, a fluoropolymer prepared by means of emulsion polymerization of a reaction mixture in an aqueous medium, includes
a) a fluoromonomer having the structure of

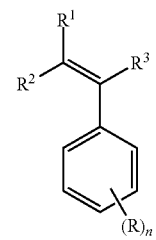

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is each independently a substituent on the styrenic ring, n is an integer from 0 to 5 representing the number of the substituents on the styrenic ring; b) an emulsion stabilizer combination comprising i) an anionic surfactant, and ii) a cationic surfactant or a non-ionic surfactant; and, c) a free-radical initiator.

Other benefits and advantages will become apparent to those skilled in the art to which it pertains upon reading and understanding of the following detailed specification.

DETAILED DESCRIPTION

A key ingredient in the emulsion polymerization is surfactant. Selection of a proper surfactant is critical to the success of emulsion polymerization. A suitable surfactant must be able to effectively emulsify the monomer, as well as stabilize the polymer particles formed during polymerization, in order to prevent the emulsion from coagulating and to obtain the desirable polymer properties. The effectiveness of a surfactant can be affected by the nature of the monomer(s) used and the polymerization conditions, such as reaction temperature and reaction mixture concentration. Common surfactants used in the art are anionic, cationic, nonionic, and a combination thereof. Among them, a combination of anionic and cationic surfactants is generally not feasible since they could form insoluble salts. Surprisingly, the present inventors have discovered that a combination of a cationic surfactant, with either an anionic surfactant or a non-ionic surfactant, is particularly effective in aqueous emulsion polymerization of a styrenic fluoromonomer. Such surfactant combinations are capable of providing stable, homogeneous emulsions throughout the polymerization process. Moreover, the polymers thus obtained are produced in high yields and exhibit the desirable polymer properties such as molecular weight, Tg, solubility, low color, and clarity, to afford polymer films or coatings with adequate mechanical and optical properties.

Thus, in one embodiment, there is provided a method for the preparation of a fluoropolymer by means of emulsion polymerization of a reaction mixture in an aqueous medium comprising:

(a) a fluoromonomer having the structure of

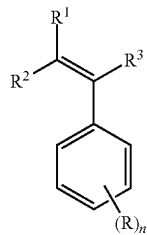

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is each independently a substituent on the styrenic ring, n is an integer from 0 to 5 representing the number of the substituents on the styrenic ring; (b) an emulsion stabilizer combination comprising (i) an anionic surfactant and (ii) a cationic surfactant or a non-ionic surfactant; and (c) a free-radical initiator.

In one aspect, the anionic surfactant in (b) is in an amount ranging from about 5 to about 20, or about 7 to about 18, or about 8 to about 17, or about 9 to about 16, or about 10 to about 15 weight % based on the fluoromonomer in (a). In another aspect, the cationic surfactant or the non-ionic surfactant in (b) is from about 0.2 to about 10, or about 0.5 to about 8, or about 0.7 to about 6, or about 0.8 to about 5, or about 0.9 to about 4, or about 1 to about 3 weight % based on the fluoromonomer in (a). In yet another aspect, the free-radical initiator in (c) is from about 0.5 to about 6, or about 2 to about 5, or about 3 to about 4 weight % based on the fluoromonomer in (a).

The emulsion stabilizer combination in (b) comprises the anionic surfactant (i) in an amount from about 8 to about 17 weight % and the cationic surfactant or the non-ionic surfactant (ii) in an amount from about 0.8 to about 5 weight %. In another embodiment, the combination of the anionic surfactant (i) in an amount from about 10 to about 15 weight % and the cationic surfactant or the non-ionic surfactant (ii) in an amount from about 1 to about 3 weight %. Said weight percents are all based on the fluoromonomer in (a).

There is also provided an aspect of the fluoromonomer in (a), wherein at least two of $R^1$, $R^2$, and $R^3$ are fluorine atoms, and in another aspect, $R^1$, $R^2$, and $R^3$ are all fluorine atoms.

The fluoromonomer may have one or more substituents on the styrenic ring. Each substituent (R) may or may not be the same. Examples of the substituents include alkyl, substituted alkyl, halogen, hydroxyl, carboxyl, nitro, alkoxy, amino, sulfonate, phosphate, acyl, acyloxy, phenyl, alkoxycarbonyl, cyano, and the like.

Examples of such fluorine-containing monomers include, but are not limited to, α,β,β-trifluorostyrene, α,β-difluorostyrene, β,β-difluorostyrene, α-fluorostyrene, and β-fluorostyrene. In one embodiment the fluoromonomer is α,β,β-trifluorostyrene.

The anionic surfactant in (b) may be a sulfate, a sulfonate, a phosphate, or a carboxylate. The sulfate may be an alkyl sulfate, alkyl benzene sulfate, or an alkyl ether sulfate. Examples of alkyl sulfates include sodium dodecyl sulfate, ammonium lauryl sulfate, sodium dodecyl benzenesulfonate, sodium decyl sulfate, sodium octyl sulfate, sodium 2-ethylhexyl sulfate, and other $C_8$ to $C_{12}$ alkyl sulfate. Examples of alkyl ether sulfates include sodium lauryl ether sulfate, sodium myreth sulfate, and other $C_8$ to $C_{18}$ alkyl ether sulfates.

The sulfonate may be a dialkyl sodium sulfosuccinate such as, for example, dioctyl sodium sulfosuccinate, or an alkyl benzene sulfonate such as, for example, sodium decylbenzene sulfonate, sodium dodecylbenzene sulfonate, or other $C_{10}$ to $C_{16}$ alkyl benzene sulfonate, or an alkyl benzene ether sulfonate such as poly(ethylene glycol) 4-nonylphenyl 3-sulfopropyl ether potassium salt, or a sulfonate fluorosurfactant such as perfluorooctanesulfonate or perfluorobutanesulfonate, or an alkyldiphenyloxide disulfonates such as DOWFAX 2A1 available from Dow Chemical Co. The phosphate may be an alkyl aryl ether phosphate or an alkyl ether phosphate. The carboxylate may be an alkyl carboxylate such as sodium stearate or a carboxylate fluorosurfactant, such as perfluorononanoate or perfluorooctanoate.

The cationic surfactant in (b) may be an acid neutralized ammonium salt of a primary, a secondary, or a tertiary amine with a long alkyl chain such as, for example, a $C_6$ to $C_{18}$ alkyl chain. Examples of such cationic surfactants include $C_8$-$C_{12}$ alkylamine hydrochloride, dodecylamine hydrochloride, didodecylamine hydrochloride, cetyl trimethylammonium chloride, dimethyldioctadecylammonium chloride, N-dodecyl pyridinium chloride, and the like.

The non-ionic surfactant in (b) may be an alkylphenol ethoxylate such as octylphenyl etherate (ex. TRITON® X-100 available from Dow Chemical Co.) or an alkyl etherate such as polyethylene glycol monoalkyl ether (for example, octaethylene glycol monododecyl ether or pentaethylene glycol monododecyl ether) or polypropylene glycol monoalkyl ether. Other examples of the non-ionic surfactant are polyoxyethylene sorbitan monooleates with trade names of Tween® 20 and Tween® 80.

Examples of the free-radical initiator (thermo or redox) in (c) include potassium persulfate, ammonium persulfate, sodium persulfate, hydrogen peroxide, dibenzoyl peroxide, lauroyl peroxide, ditertiary butyl peroxide, t-butyl hydroperoxide, cumene hydroperoxide, dicumyl peroxide, t-butyl peroxybenzoate, benzoyl peroxide, 2,2'-azobisisobutyronitrile, 4,4'-azobis(4-cyanovaleric acid), 1,1'-azobis(cyclohexanecarbonitrile), 2,2'-azobis(2-methylpropionitrile), and the like.

When the above initiators are used for the redox system, they are used in combination with a reducing agent and, optionally, a catalyst. Suitable reducing agents are those which increase the rate of polymerization and include, for example, sodium bisulfite, sodium metabisulfite, sodium formaldehyde sulfoxylate, ascorbic acid, isoascorbic acid, and mixtures thereof. Suitable catalysts are those compounds that increase the rate of polymerization and that, in combination with the above described reducing agents, promote decomposition of the polymerization initiator under the reaction conditions. Suitable catalysts include transition metal compounds such as, for example, ammonium iron (II) sulfate hexahydrate, ferrous chloride, cupric sulfate, cupric chloride, cobalt acetate, cobaltous sulfate, and mixtures thereof.

A variety of techniques known in the art for aqueous emulsion polymerization can be utilized. Examples of the techniques include: charging all the reactants at the start of the reaction before the mixture is heated; co-feeding the monomer and the initiator to the aqueous surfactant dispersion during the reaction; pre-emulsifying the monomer with one or more surfactants and subsequently feeding to the reaction mixture along with the initiator feed; and pre-reacting a small ratio (e.g. 5%) of the reactants to form polymer latex "seeds," followed by the feeding of the remaining reactants. Further, the emulsion stabilizer combination used may be prepared independently by mixing the anionic surfactant with either a cationic or a non-ionic surfactant to form a mixture, which is subsequently employed as a single surfactant for the emulsion polymerization.

The aqueous emulsion polymerization, in one embodiment, is conducted at about 30 to about 80° C., or at about 35 to about 70° C., or at about 40 to about 60° C., and in another embodiment at about 50 to about 55° C. It was found that, when the reaction temperature is controlled at 50 to 55° C., yields as high as >95% can be achieved. The reaction mixture, in one embodiment, has percent solids at a range of about 10 to about 60% or about 30 to about 55% and in another embodiment, at about 40 to about 50%. The reaction time, in one embodiment, ranges from about 10 hours to about 3 days, and in another embodiment, from about 15 to about 24 hours. The fluoropolymer thus prepared, in accordance with one embodiment, has a weight average molecular weight (Mw) not less than about 200,000 g/mole, or not less than about 250,000, or not less than about 300,000 as measured (polystyrene equivalent) by gel permeation chromatography (GPC). A chain transfer agent commonly used in the art, for example, isooctyl 3-mercaptopropionate, may be added to the reaction mixture to further control the molecular weight of the polymer. The glass transition temperature (Tg) of the fluoropolymer may be >about 200° C., or >about 203° C., or >about 205° C., or >about 207° C., or >about 209° C., or >about 211° C.

In some applications, it may be desirable to reduce the solution viscosity of the fluoropolymer in a solvent. This can be achieved by increasing the emulsion polymerization temperature to reduce the molecular weight of the polymer. For example, it was found that when the reaction was conducted at 55, 60, 65, and 70° C. respectively, the intrinsic viscosity of the resulting polymer was 1.02, 0.69, 0.51, and 0.36 dL/g respectively, as measured by a Cannon® auto capillary viscometer using cyclopentanone as the solvent at 30° C., while maintaining a reaction yield around 88-89%. Thus, this invention further provides a method for controlling the molecular weights of the fluoropolymer by conducting the emulsion polymerization at a maximum temperature ranging from about 40 to about 80° C., such as at 40° C. 45° C., 50° C., 55° C., 60° C., 65° C., 70° C., 75° C. or 80° C.

The emulsion polymerization process as described in this invention can be practiced commercially by a batch, semi-batch, or continuous process commonly known in the industry. The reaction can be carried out at the ambient pressure in an unpressurized reactor; however, if it is desirable, the reaction can also be carried out in a pressurized reactor at a suitable temperature. The process may be further modified to obtain a product with desirable molecular weight distribution and particle size distribution by a method known in the art.

It was found that the residual solvent such as tetrahydrofuran (THF) present in the fluoromonomer could have a negative effect on the reaction yield and the resulting fluoropolymer's molecular weight and Tg. For example, when the THF ratio is 5%, the yield is about 79% and the intrinsic viscosity (IV) is 0.95 dL/g; when THF is 10%, the yield is about 80% and the IV is 0.63 dL/g. Thus, the fluoromonomer used in this embodiment has a THF content less than about 5%, or less than about 4%, or less than about 3%, or less than about %, or less than about 1%, or less than about 0.5%, or less than about 0.1%, all weight % based on the fluoromonomer.

The copolymer may be prepared by copolymerization of one or more of the fluorine-containing monomers with one or more of ethylenically unsaturated monomers. Examples of ethylenically unsaturated monomers include, but not limited to, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate. 2-ethylhexyl acrylate, isoprene, octyl acrylate, octyl methacrylate, iso-octyl acrylate, iso-octyl methacrylate, trimethyolpropyl triacrylate, styrene, α-methyl styrene, nitrostyrene, bromostyrene, iodostyrene, cyanostyrene, chlorostyrene, 4-t-butylstyrene, 4-methylstyrene, vinyl biphenyl, vinyl biphenyl, vinyl toluene, chloromethyl styrene, acrylic acid, methacrylic acid, itaconic acid, crotonic acid, maleic anhydride, tetrafluoroethylene (and other fluoroethylenes), glycidyl methacrylate, carbodiimide methacrylate. $C_1$-$C_{18}$ alkyl crotonates, di-n-butyl maleate, di-octylmaleate, al methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth) acrylate, methacrylamide, acrylamide, butyl acrylamide, ethyl acrylamide, diacetoneacrylamide, butadiene, vinyl ester monomers, vinyl(meth)acrylates, isopropenyl(meth) acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea. Further monomers are described in The Brandon Associates, 2nd edition, 1992 Merrimack, N.H., and in Polymers and Monomers, the 1966-1997 Catalog from Polyscience. Inc., Warrington, Pa., U.S.A.

In one embodiment, the polymer is a copolymer of α,β,β-trifluorostyrene with one or more of ethylenically unsaturated monomers selected from the group consisting of styrene, methyl acrylate, methyl methacrylate, butyl acrylate, butyl methacrylate, 2-ethylhexyl acrylate, acrylic acid, methacrylic acid, α-methyl styrene, 4-methylstyrene, vinyl biphenyl, acrylonitrile, and isoprene.

The fluoropolymer obtained according to the method of this invention may be used for optical film application. In such an application, it is desirable to have a polymer substantially free of surfactants and other impurities; thus, the polymer emulsion of the invention undergoes further processing. In a further embodiment, a particulate solid fluoropolymer is isolated from the aqueous emulsion of the fluoropolymer. In order to isolate the solid, the aqueous emulsion is destabilized first to cause the latex particles to coagulate. This can be achieved, for example, by adding an aqueous solution of an acid or base such as, for example, hydrochloric acid or sodium hydroxide, to change the pH, or by adding an inorganic salt such as, for example, aluminum chloride, calcium chloride, or sodium chloride, or by cooling the emulsion at a low temperature or by partially removing water either at an ambient temperature or pressure, or at an elevated temperature or reduced pressure. The resulting heterogeneous mixture can then be mixed with a water miscible non-solvent such as methanol or ethanol to form a solid precipitate, which is subsequently filtered.

Alternatively, the polymer emulsion may be spray dried using a spray dry machine such as jet spray drier or centrifuge spray drier to yield fine powders. Spray dry is used in large scale industrial production to isolate the solid from the emulsion because of its ease of processing. However, the high-speed spraying operation may require an emulsion that is stable and free of solid particulate substances to prevent it from clogging the spray gun. The PTFS emulsion of the invention is stable and substantially free of particulate substances, and thus, is particularly suitable for the spray dry process.

The solids isolated from various methods as described would require further purification to remove the surfactants and other impurities. This can be achieved by washing the solids with hot non-solvents such as alcohol and water, or by extraction, or by filtration, or by re-precipitation, or by other methods known in the art. The final purified solid fluoropolymer may be powdery or fibrous.

EXAMPLES

Comparative Example

Emulsion Polymerization of α,β,β-trifluorostyrene in the Presence of Sodium Dodecyl Sulfate To a 150 mL 3-neck glass reactor equipped with a nitrogen inlet, a nitrogen outlet, and a mechanical stirrer was charged 15.0 g deionized water. The reactor was immersed in a water bath equipped with a temperature controller. The solution was purged with nitrogen for 30 minutes to remove oxygen. After that, 1.50 g sodium dodecyl sulfate was charged to the reactor. The mixture was stirred at 50° C. under nitrogen in order to disperse the surfactant, which was followed by the addition of the monomer, α,β,β-trifluorostyrene (TPS, 15.0 g), and the initiator, potassium persulfate (0.15 g). The polymerization was allowed to proceed at 50° C. for 65 hours. It was found that coagulation occurred during polymerization, leading to the formation of solid precipitates. A heterogeneous mixture with a significant amount of solid mass was obtained. The resulting product was deemed unfit for use.

Example 1

Emulsion Polymerization of α,β,β-trifluorostyrene in the Presence of Sodium Dodecyl Sulfate and Dodecylamine Hydrochloride Prepared In Situ To a 150 mL 3-neck glass reactor equipped with a nitrogen inlet, a nitrogen outlet, and a mechanical stirrer were charged 20.6 g deionized water and 14.36 g HCl aqueous solution (0.106 mol/kg). The reactor was immersed in a water bath equipped with a temperature controller. The solution was purged with nitrogen for 30 minutes to remove oxygen. After that, 0.193 g dodecylamine and 2.25 g sodium dodecyl sulfate were charged to the reactor. The mixture was stirred at 50° C. under nitrogen in order to disperse the surfactants, which was followed by the addition of the monomer, α,β,β-trifluorostyrene (IFS. 15.0 g), and the initiator, potassium persulfate (0.36 g). The polymerization was allowed to proceed at 50° C. for 24 hours to yield a homogeneous emulsion. The resulting emulsion was treated with an excess of methanol and subsequently filtered to yield a crude solid product, which was further purified by washing with methanol and deionized water. The purified product was dried under vacuum to yield a solid polymer. Yield: 86%. Glass transition temperature of the polymer was 210° C. as measured by DSC. Intrinsic viscosity of the polymer was 2.04 dL/g, measured by a Cannon® auto capillary viscometer using cyclopentanone as the solvent at 30° C. Molecular weight of the polymer was determined by GPC using THF as the eluting solvent and polystyrene standard for calibration: Mn (number average molecular weight)=88,528 g/mol; Mw weight average molecular weight)=834,085 g/mol.

Example 2

Emulsion Polymerization of α,β,β-trifluorostyrene in the Presence of Sodium Dodecyl Sulfate and Dodecylamine Hydrochloride To a 150 mL 3-neck glass reactor equipped with a nitrogen inlet, a nitrogen outlet, and a mechanical stirrer was charged 20.6 g deionized water. The reactor was immersed in a water bath equipped with a temperature controller. The solution was purged with nitrogen for 30 minutes to remove oxygen. After that, 0.30 g dodecylamine and 2.40 g sodium dodecyl sulfate were charged to the reactor. The mixture was stirred at 50° C. under nitrogen in order to disperse the surfactants, which was followed by the addition of the monomer, α,β,β-trifluorostyrene (TFS, 20.0 g), and the initiator, potassium persulfate (0.72 g). The polymerization was allowed to proceed at 50° C. for 18 hours to yield a homogeneous emulsion. The resulting emulsion was placed on a rotavaporator under reduced pressure and elevated temperature to remove the volatiles. The remaining solid was collected, washed with methanol and deionized water, and dried under vacuum to yield a powdery polymer. Yield: 87%. Glass transition temperature of the polymer was 211° C. as measured by DSC. Intrinsic viscosity of the polymer was 1.41 dL/g, measured by a Cannon® auto capillary viscometer using cyclopentanone as the solvent at 30° C. Molecular weight of the polymer was determined by GPC using THF as the eluting solvent and polystyrene standard for calibration: Mn=51,344 g/mol; Mw=501,604 g/mol.

Example 3

Emulsion Polymerization of α,β,β-trifluorostyrene in the Presence of Sodium Dodecyl Sulfate and Tween® 80

To a 150 mL 3-neck glass reactor equipped with a nitrogen inlet, a nitrogen outlet, and a mechanical stirrer was charged 20.6 g deionized water. The reactor was immersed in a water bath equipped with a temperature controller. The solution was purged with nitrogen for 30 minutes to remove oxygen. After that, 0.60 g Tween® (polysorbate 80, available from Sigma-Aldrich) and 2.10 g sodium dodecyl sulfate were charged to the reactor. The mixture was stirred at 50° C. under nitrogen in order to disperse the surfactants, which was followed by the addition of the monomer, α,β,β-trifluorostyrene (TFS. 20.0 g), and the initiator, potassium persulfate (0.72 g). The polymerization was allowed to proceed at 50° C. for 18 hours to yield a homogeneous emulsion. The resulting emulsion was placed on a rotavaporator under reduced pressure and elevated temperature to remove the volatiles. The remaining solid was collected, washed with methanol and deionized water, and dried under vacuum to yield a powdery polymer. Yield: 79.1%. Glass transition temperature of the polymer was 207° C. as measured by DSC. Intrinsic viscosity of the polymer was 0.85 dL/g, measured by a Cannon® auto capillary viscometer using cyclopentanone as the solvent at 30° C.

Example 4

Emulsion Polymerization of α,β,β-trifluorostyrene in the Presence of Sodium Dodecyl Sulfate and Triton® 100

To a 150 mL 3-neck glass reactor equipped with a nitrogen inlet, a nitrogen outlet, and a mechanical stirrer was charged 20.6 g deionized water. The reactor was immersed in a water bath equipped with a temperature controller. The solution was purged with nitrogen for 30 minutes to remove oxygen. After that, 0.60 g Triton® 100 (available from Dow Chemical Co.) and 2.10 g sodium dodecyl sulfate were charged to the reactor. The mixture was stirred at 50° C. under nitrogen in order to disperse the surfactants, which was followed by the addition of the monomer, α,β,β-trifluorostyrene (TFS, 20.0 g), and the initiator, potassium persulfate (0.72 g). The polymerization was allowed to proceed at 50° C. for 72 hours to yield a homogeneous emulsion. The resulting emulsion was placed on a rotavaporator under reduced pressure and elevated temperature to remove the volatiles. The remaining solid was collected, washed with methanol and deionized water, and dried under vacuum to yield a powdery polymer. Yield: 74.8%. Glass transition temperature of the polymer was 209° C. as measured by DSC. Intrinsic viscosity of the polymer was 0.85 dL/g, measured by a Cannon® auto capillary viscometer using cyclopentanone as the solvent at 30° C.

Example 5

Emulsion Polymerization of α,β,β-trifluorostyrene in the Presence of Sodium Dodecyl Sulfate and Triton®100 in Various Ratios In accordance with the method described in Example 4, a series of emulsion polymerizations was carried out using various combinations of sodium dodecyl sulfate (SDS) and Triton® 100 in various ratios. The results are listed in Table 1 below. This example illustrates one embodiment of ratios of the surfactants required for the emulsion polymerization to result in high yields and the desired properties of the fluoropolymer.

TABLE 1

| Reaction | SDS/TFS | Triton ®/TFS | Yield | Tg (° C.) | IV (dL/g) |
|---|---|---|---|---|---|
| 1 | 10.5% | 3% | 85% | 209 | 0.85 |
| 2 | 9% | 3% | 70% | 208 | 0.73 |
| 3 | 6% | 6% | 60% | 208 | 0.66 |
| 4 | 6% | 2% | 57% | 207 | 0.56 |
| 5 | 3% | 3% | 43% | 207 | 0.55 |
| 6 | 3% | 2% | 41% | 207 | 0.47 |
| 7 | 3% | 9% | 6% | 154 | 0.10 |
| 8 | 3% | 12% | 9% | 153 | 0.09 |

Example 6

Emulsion Polymerization of α,β,β-trifluorostyrene in the Presence of Sodium Dodecyl Sulfate (SDS) and Dodecylamine Hydrochloride (DA.HCl) at Various Temperatures In accordance with the method described in Example 2, a series of emulsion polymerizations was carried out at various temperatures. The results are listed in Table 2 below. Each reaction was carried out at a concentration of 40% solids in the presence of potassium persulfate ($K_2S_2O_8$) as the initiator ($K_2S_2O_8$/TFS=3.6%) for 18 hours. This example illustrates one embodiment of the method for preparing the fluoropolymer having lower solution viscosity.

TABLE 2

| Reaction | SDS/TFS | DA.HCl/TFS | Reaction Temp (° C.) | Yield (%) | IV (dL/g) | Mw (g/mol) |
|---|---|---|---|---|---|---|
| 1 | 12% | 1.5% | 55 | 89 | 1.02 | 280,972 |
| 2 | 12% | 1.5% | 60 | 89 | 0.69 | 172,634 |
| 3 | 12% | 1.5% | 65 | 88 | 0.51 | 105,683 |
| 4 | 12% | 1.5% | 70 | 88 | 0.36 | 62,715 |

Example 7

Emulsion Polymerization of α,β,β-trifluorostyrene and Styrene in the Presence of Sodium Dodecyl Sulfate and Dodecylamine Hydrochloride To a 150 mL 3-neck glass reactor equipped with a nitrogen inlet, a nitrogen outlet, and a mechanical stirrer was charged 20.6 g deionized water. The reactor was immersed in a water bath equipped with a temperature controller. The solution was purged with nitrogen for 30 minutes to remove oxygen. After that, 0.30 g dodecylamine and 2.40 g sodium dodecyl sulfate were charged to the reactor. The mixture was stirred at 50° C. under nitrogen in order to disperse the surfactants, which was followed by the addition of the monomers, α,β,β-trifluorostyrene (IFS, 10.0 g) and styrene (10.0 g), and the initiator, potassium persulfate (0.72 g). The polymerization was allowed to proceed at 50° C. for 18 hours to yield a homogeneous emulsion. The resulting emulsion was placed on a rotavaporator under reduced pressure and elevated temperature to remove the volatiles. The remaining solid was collected, washed with methanol and deionized water, and dried under vacuum to yield a powdery polymer. Yield: 91.5%. Glass transition temperature of the polymer was 148° C. as measured by DSC. Intrinsic viscosity of the polymer was 2.33 dL/g, measured by a Cannon® auto capillary viscometer using cyclopentanone as the solvent at 30° C.

Example 8

Figure 2:
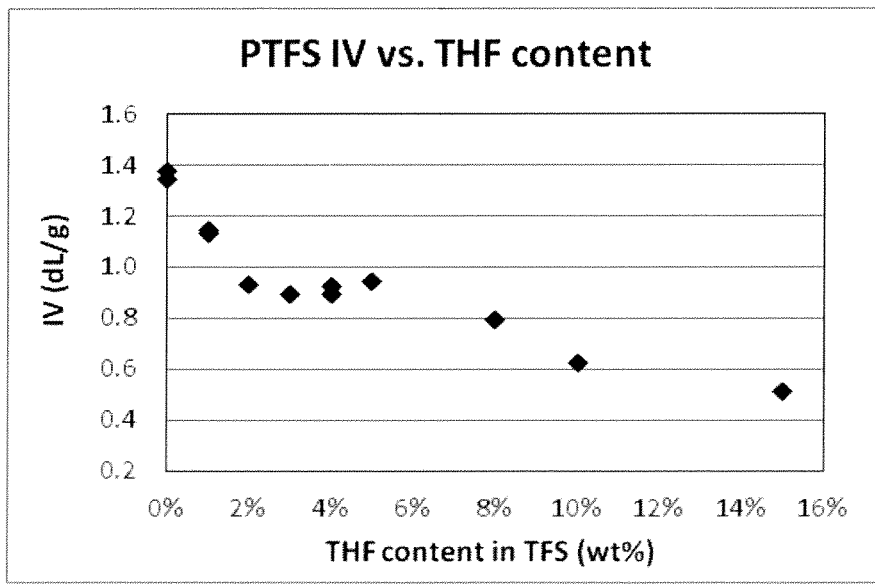

Effects of the Tetrahydrofuran (THF) Content in TFS Monomer on Reaction Yield and Polymer Molecular Weight A series of emulsion polymerizations was carried out by using IFS containing various levels of the THF impurity in order to study its effect on the reaction yield and the polymer molecular weight as represented by the intrinsic viscosity (IV). The results are plotted in FIGS. 1 and 2.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:

1. A method for the preparation of a fluoropolymer, wherein the method comprises the step of:
   emulsion polymerization of a reaction mixture in an aqueous medium, the reaction mixture comprising:
   a) a fluoromonomer having the structure of

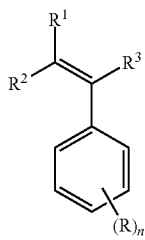

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is each independently a substituent on the styrenic ring, n is an integer from 0 to 5 representing the number of the substituents on the styrenic ring;
   b) an emulsion stabilizer combination comprising:
      i) an anionic surfactant wherein the anionic surfactant is in an amount ranging from about 8 to about 17 weight % based on the fluoromonomer, and
      ii) a cationic surfactant; wherein the cationic surfactant is from about 0.8 to about 5 weight % based on the fluoromonomer; and
   c) a free-radical initiator.

2. The method of claim 1, wherein the anionic surfactant is in an amount ranging from about 10 to about 15 weight % based on the fluoromonomer, and the cationic surfactant is from about 1 to about 3 weight % based on the fluoromonomer.

3. The method of claim 1, wherein the free-radical initiator is from about 2 to about 5 weight % based on the fluoromonomer.

4. The method of claim 1, wherein the emulsion polymerization is carried out at a maximum temperature ranging about 40° C. to about 80° C., wherein the reaction mixture has percent solids of about 30 to about 50%.

5. The method of claim 1, wherein $R^1$, $R^2$, and $R^3$ of the fluoromonomer are fluorine atoms.

6. The method of claim 1, wherein the anionic surfactant is one or more selected from the group comprising a $C_8$-$C_{12}$ alkylsulfate, sodium dodecyl sulfate, ammonium lauryl sulfate, sodium dodecyl benzenesulfonate, sodium decyl sulfate, sodium octyl sulfate, sodium 2-ethylhexyl sulfate, dioctyl sodium sulfosuccinate, sodium decylbenzene sulfonate, sodium dodecylbenzene sulfonate, poly(ethylene glycol) 4-nonylphenyl 3-sulfopropyl ether potassium salt, alkyldiphenyloxide disulfonates, perfluorobutanesulfonate, and perfluorooctanesulfonate, wherein the cationic surfactant is one or more selected from the group comprising a $C_8$-$C_{12}$ alkylamine hydrochloride, dodecylamine hydrochloride, didodecylamine hydrochloride, cetyl trimethylammonium chloride, dimethyldioctadecylammonium chloride, and N-dodecyl pyridinium chloride.

7. The method of claim 1, wherein the anionic surfactant is a $C_8$-$C_{12}$ alkylsulfate in an amount from about 10 to about 15 weight % based on the fluoromonomer, the cationic surfactant is a $C_8$-$C_{12}$ alkylamine hydrochloride in an amount ranging from about 1 to about 3 weight % based on the fluoromonomer, and the free-radical initiator is from about 2 to about 5 weight % based on the fluoromonomer.

8. The method of claim 7, wherein the emulsion polymerization is carried out at a maximum temperature of about 60° C.

9. The method of claim 8, wherein the fluoromonomer is α,β,β-trifluorostyrene.

10. The method of claim 1, wherein the fluoromonomer has a residual THF content less than about 5%, based on the weight of the fluoromonomer.

11. The method of claim 1, wherein the reaction mixture further comprises one or more ethylenically unsaturated monomers selected from the group consisting of styrene, methyl acrylate, methyl methacrylate, butyl acrylate, butyl methacrylate, 2-ethylhexyl acrylate, acrylic acid, methacrylic acid, α-methyl styrene, 4-methylstyrene, vinyl biphenyl, acrylonitrile, and isoprene.

12. The method of claim 1, wherein R is chosen from the group comprising alkyl, substituted alkyl, halogen, hydroxyl, carboxyl, nitro, alkoxy, amino, sulfonate, phosphate, acyl, acyloxy, phenyl, alkoxycarbonyl, and cyano.

13. The method of claim 1, further comprising:
   processing the fluoropolymer emulsion to yield a particulate solid by using one or more methods selected from the group comprising spray dry, changing the pH, adding an inorganic salt, partially removing water, and cooling.

14. The method of claim 13, wherein the method further comprises the step of:
   further purifying the particulate solid to remove the surfactants and other impurities by using one or more methods selected from the group comprising washing with nonsolvents, extraction, filtration, and re-precipitation.

15. A method for the preparation of a fluoropolymer, wherein the method comprises the step of:
   emulsion polymerization of a reaction mixture in an aqueous medium, the reaction mixture comprising:

a) a fluoromonomer having the structure of

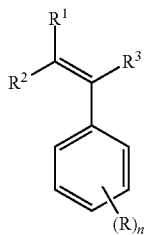

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, and wherein R is each independently a substituent on the styrenic ring, n is an integer from 0 to 5 representing the number of the substituents on the styrenic ring;
b) an emulsion stabilizer combination comprising:
  i) an anionic surfactant comprising a $C_8$-$C_{12}$ alkylsulfate in an amount from about 10 to about 15 weight % based on the fluoromonomer; and,
  ii) a cationic surfactant comprising $C_8$-$C_{12}$ alkylamine hydrochloride in an amount ranging from about 1 to about 3 weight % based on the fluoromonomer; and
c) a free-radical initiator.

16. The method of claim 15, wherein the free-radical initiator is in the amount of about 2 to about 5 weight % based on the fluoromonomer.

17. The method of claim 15, wherein the emulsion polymerization is carried out at a maximum temperature ranging from about 40° C. to about 80° C., wherein the reaction mixture has percent solids of about 30 to about 50%.

18. The method of claim 17, wherein the emulsion polymerization is carried out at a maximum temperature of about 60° C.

19. The method of claim 15, wherein $R^1$, $R^2$, and $R^3$ of the fluoromonomer are fluorine atoms.

20. The method of claim 15, wherein the fluoromonomer is α,β,β-trifluorostyrene.

21. The method of claim 15, wherein the fluoromonomer has a residual THF content less than about 5%, based on the weight of the fluoromonomer.

22. The method of claim 15, wherein the reaction mixture further comprises one or more ethylenically unsaturated monomers selected from the group consisting of styrene, methyl acrylate, methyl methacrylate, butyl acrylate, butyl methacrylate, 2-ethylhexyl acrylate, acrylic acid, methacrylic acid, α-methyl styrene, 4-methylstyrene, vinyl biphenyl, acrylonitrile, and isoprene.

23. The method of claim 15, wherein R is chosen from the group comprising alkyl, substituted alkyl, halogen, hydroxyl, carboxyl, nitro, alkoxy, amino, sulfonate, phosphate, acyl, acyloxy, phenyl, alkoxycarbonyl, and cyano.

24. The method of claim 15 further comprising:
  processing the fluoropolymer emulsion to yield a particulate solid by using one or more methods selected from the group comprising spray dry, changing the pH, adding an inorganic salt, partially removing water, and cooling.

25. The method of claim 24, wherein the method further comprises the step of:
  further purifying the particulate solid to remove the surfactants and other impurities by using one or more methods selected from the group comprising washing with non-solvents, extraction, filtration, and re-precipitation.

* * * * *